United States Patent

Yamamoto et al.

Patent Number: 5,288,810
Date of Patent: Feb. 22, 1994

[54] VULCANIZED RUBBER COMPOSITION AND RUBBER VIBRATION INSULATOR

[75] Inventors: Keisaku Yamamoto; Yoshio Tanimoto; Kiyosi Ikeda; Eiichi Usuda, all of Chiba, Japan

[73] Assignee: Sumitomo Chemical Company Limited, Osaka, Japan

[21] Appl. No.: 999,617

[22] Filed: Dec. 31, 1992

Related U.S. Application Data

[63] Continuation-in-part of Ser. No. 822,877, Jan. 21, 1992, abandoned.

[30] Foreign Application Priority Data

Feb. 4, 1991 [JP] Japan .................... 3-13324

[51] Int. Cl.$^5$ ............................... C08F 8/30
[52] U.S. Cl. .................. 525/327.6; 525/329.5; 525/329.6; 525/329.9; 525/331.7; 525/375; 525/377
[58] Field of Search .......... 525/327.6, 329.5, 329.6, 525/329.9, 331.7

[56] References Cited

U.S. PATENT DOCUMENTS 5,002,829  3/1991  Shibahara .
5,106,913  4/1992  Yamaguchi et al. .

FOREIGN PATENT DOCUMENTS 0014018  8/1980  European Pat. Off. .
0253365  1/1988  European Pat. Off. .
0391733  10/1990  European Pat. Off. .
0394016  10/1990  European Pat. Off. .
0451539  10/1991  European Pat. Off. .

*Primary Examiner*—Bernard Lipman
*Attorney, Agent, or Firm*—Cushman, Darby & Cushman

[57] ABSTRACT

A vulcanized rubber composition which is obtained by vulcanizing a modified ethylene-α-olefin-nonconjugated diene copolymer rubber composition defined below with sulfur or organic peroxides, said modified rubber composition comprising an ethylene-α-olefin-nonconjugated diene copolymer rubber modified with 0.01–0.15% by weight of an unsaturated carboxylic acid or a derivative thereof on the basis of the modified ethylene-α-olefin-nonconjugated diene copolymer rubber and at least one dinitroamine represented by the following formula (A):

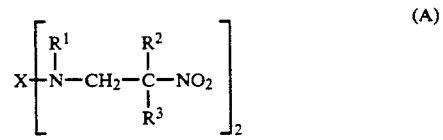

wherein X represents a divalent chain aliphatic, cyclic aliphatic or aromatic group which may contain a halogen or oxygen, $R^1$ represents a hydrogen atom, a chain aliphatic group, a cyclic aliphatic group or an aromatic group with a proviso that when both X and $R^1$ represent a chain aliphatic group, nitrogen atoms may further link to each other through $R^1$, and $R^2$ and $R^3$ each represents a hydrogen atom or an alkyl group of 1–12 carbon atoms and $R^2$ and $R^3$ may link to each other to form a ring. The vulcanized rubber composition is excellent in fatigue resistance against repeatedly applied deformation.

11 Claims, No Drawings

VULCANIZED RUBBER COMPOSITION AND RUBBER VIBRATION INSULATOR

This is a continuation-in-part application of U.S. Ser. No. 07/822,877 filed Jan. 21, 1992, now abandoned.

The present invention relates to a vulcanized rubber composition and a rubber vibration insulator. More particularly, it relates to a vulcanized rubber composition obtained by vulcanizing a modified ethylene-α-olefin-nonconjugated diene copolymer rubber composition having excellent fatigue resistance not only in ordinary temperature atmosphere, but also in high temperature atmosphere owing to its excellent heat resistance and fatigue resistance. The copolymer rubber composition can be most suitably utilized, for example, as rubber vibration insulators for automobiles and for industrial purposes.

Varieties of rubber vibration insulators are used for inhibition of noise and vibration in traffic means such as automobiles and motorbikes and in industrial machines. Especially, in the field of automobiles, development of rubber vibration insulators which are excellent in heat resistance and have excellent fatigue resistance not only in ordinary temperature atmosphere, but also in high temperature atmosphere and which can inhibit generation of noise and vibration and can provide comfortable ride have been increasingly demanded with recent enhancement in performance of engines.

Characteristics required for such rubber vibration insulators are as follows:

(1) They must be excellent in heat resistance.

(2) They must be excellent in fatigue resistance and endurance against external force applied repeatedly for a long time in ordinary temperature and high temperature atmospheres.

Besides, it is also important that they are not inferior to conventional rubbers in static rubber characteristics such as compression set and tear strength.

Highly unsaturated rubbers such as natural rubbers and styrene-butadiene rubbers (SBR) have been mainly used as conventional rubber vibration insulators. That is because unsaturated rubbers such as natural rubbers and SBR are superior to lowly unsaturated rubbers in fatigue resistance and dynamic characteristics. However, it has been known that these highly unsaturated rubbers are inferior in heat resistance to lowly unsaturated rubbers such as ethylene-α-olefin-non-conjugated diene copolymer rubbers and for this reason, use of highly unsaturated rubbers has often been limited to the use at relatively low temperatures.

On the other hand, lowly unsaturated rubbers such as ethylene-α-olefin-non-conjugated diene copolymer rubbers have excellent heat resistance, but are inferior in fatigue resistance against external forces applied repeatedly for a long time and hence, cannot be used under severe external forces or severe deformation conditions.

An object of the present invention is to provide a vulcanized rubber composition prepared from vulcanizing rubber compositions which are excellent in heat resistance and besides in fatigue resistance against repeated deformation in ordinary and high temperature atmospheres. The other object is to provide a rubber vibration insulator prepared from the vulcanized rubber composition.

After intensive research conducted by the inventors, the present invention has been accomplished.

That is, the present invention relates to a vulcanized rubber composition and a rubber vibration insulator. The vulcanized rubber composition is prepared by vulcanizing a modified ethylene-α-olefin-nonconjugated diene copolymer rubber composition with sulfur or organic peroxides. The starting copolymer rubber composition comprises an ethylene-α-olefin-non-conjugated diene copolymer rubber modified with unsaturated carboxylic acids or derivatives thereof and at least one dinitroamine represented by the following formula (A):

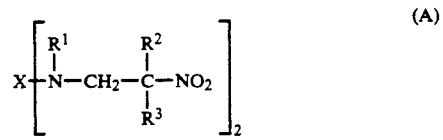

(wherein X represents a divalent chain aliphatic, cyclic aliphatic or aromatic group which may contain halogen or oxygen, $R^1$ represents a hydrogen atom, a chain aliphatic group, a cyclic aliphatic group or an aromatic group with a proviso that when both X and $R^1$ represent a chain aliphatic group, nitrogen atoms may further link to each other through $R^1$, and $R^2$ and $R^3$ each represents a hydrogen atom or an alkyl group of 1-12 carbon atoms and $R^2$ and $R^3$ may link to each other to form a ring).

The present invention will be explained in detail.

The modified ethylene-α-olefin-non-conjugated diene copolymer rubbers used in the present invention are ethylene-α-olefin-non-conjugated diene copolymer rubbers modified with unsaturated carboxylic acids or derivatives thereof.

Examples of the α-olefin which is one constituent of ethylene-α-olefin-non-conjugated diene copolymer rubbers are propylene, 1-butene and 1-hexane and preferred is propylene. Examples of the nonconjugated diene are 5-methylene-2-norbornene, 5-ethylidene-2-norbornene and dicyclopentadiene and preferred is 5-ethylidene-2-norbornene.

The unsaturated carboxylic acids used for modification of ethylene-α-olefin-nonconjugated diene copolymer rubbers include, for example, acrylic acid, methacrylic acid, maleic acid, itaconic acid, citraconic acid, hymic acid, bicyclo(2,2,2)octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo(2,2,1)octa-7-ene-2,3,5,6-tetracarboxylic acid, and 7-oxabicyclo(2,2,1)hepta-5-ene-2,3-dicarboxylic acid.

The derivatives of unsaturated carboxylic acids include acid anhydrides, esters, amides, imides and metal salts. Examples are maleic anhydride, itaconic anhydride, citraconic anhydride, hymic anhydride, monoethyl maleate, monoethyl fumarate, monomethyl itaconate, monomethyl fumarate, dimethylaminoethyl methacrylate, dimethylaminopropylacrylamide, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. These unsaturated carboxylic acids or derivatives thereof may be used singly or in combination of two or more. Maleic anhydride is generally used.

Generally, the modification of ethylene-α-olefin-nonconjugated diene copolymer rubber is attained by kneading the copolymer rubber with the carboxylic acids or derivatives thereof in the presence of a radical former at 110° C. or higher.

The radical former used here includes, for example, 2,2'-dithiobis-benzothiazole and organic peroxides. The organic peroxides are not critical and there may be used at least one of organic peroxides such as diaryl peroxides, dialkyl peroxides, peroxy esters and perketals. Examples thereof are benzoyl peroxide, 1,1-di-t-butylperoxy 3,3,5-trimethylcyclohexane, di-t-butylperoxydiisopropylbenzene, dicumyl peroxide and 2,5-dimethyl-2,5-di(t-butylperoxy)hexane.

The kneading is carried out by internal kneading machines such as Banbury mixer and kneaders or extruders.

Another method for modification of the ethylene-α-olefin-nonconjugated diene copolymer rubbers is dissolving the copolymer rubber and the carboxylic acids or derivatives thereof in organic solvents such as xylene, adding radical formers to the solution in a nitrogen atmosphere, heating under stirring, cooling the reaction mixture, introducing it in a large amount of a non-solvent such as acetone to recover the polymer, washing and drying. JP-A-62-112614 is referred to as the method of modification in the form of solution mentioned above.

An addition amount of the unsaturated carboxylic acids or derivatives thereof on the modified ethylene-α-olefin-nonconjugated diene copolymer rubbers is 0.01–0.15%, preferably 0.02–0.10% by weight, on the basis of modified ethylene-α-olefin-nonconjugated diene copolymer rubbers. If the addition amount of the unsaturated carboxylic acids or derivatives thereof is too small, no satisfactory endurance is obtained. If the addition amount is too large, gels appear.

Examples of the dinitrodiamines represented by the formula (A) used in the present invention are shown below. In the following examples, -Z represents

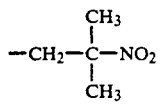

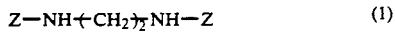 (1)     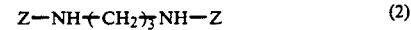 (2)

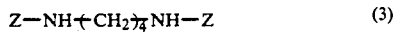 (3)     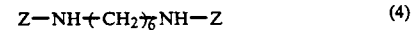 (4)

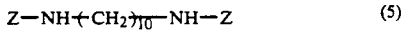 (5)     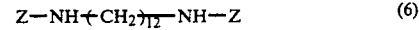 (6)

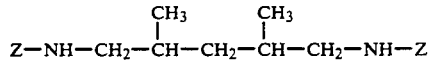 (7)      (8)

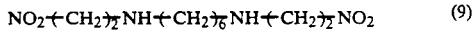 (9)     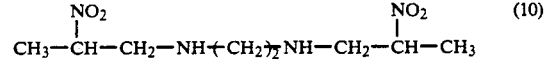 (10)

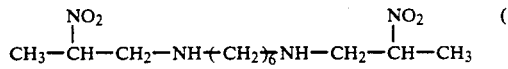 (11)    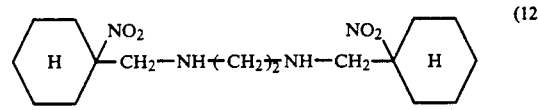 (12)

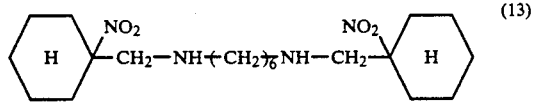 (13)    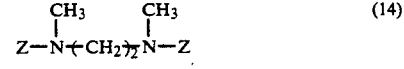 (14)

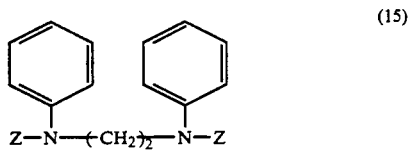 (15)    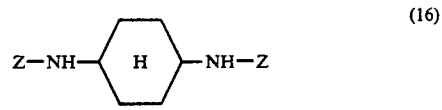 (16)

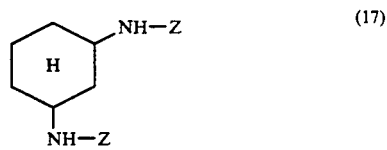 (17)   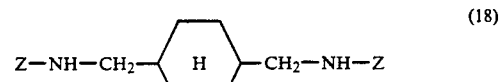 (18)

-continued
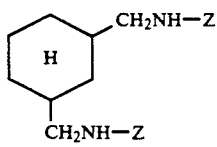 (19)
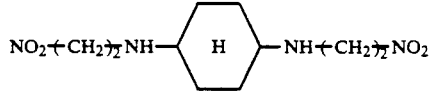 (20)
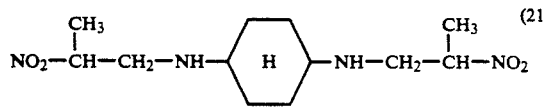 (21)
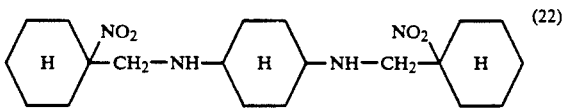 (22)
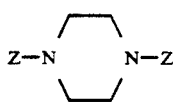 (23)
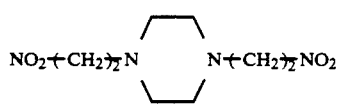 (24)
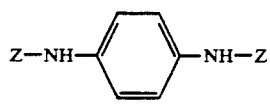 (25)
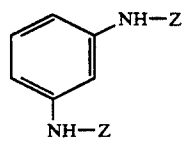 (26)
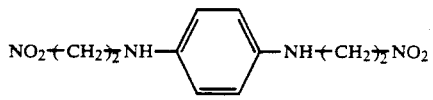 (27)
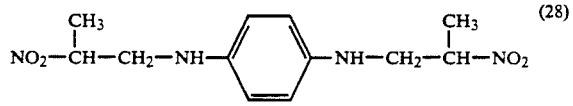 (28)
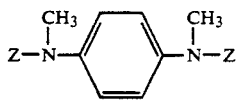 (29)
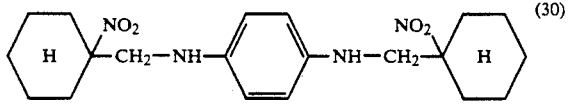 (30)
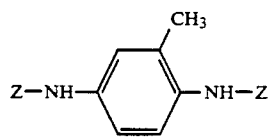 (31)
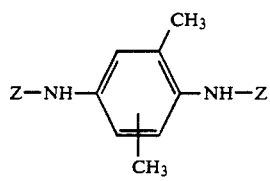 (32)
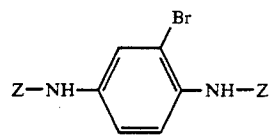 (33)
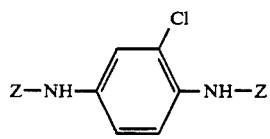 (34)
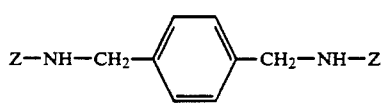 (35)
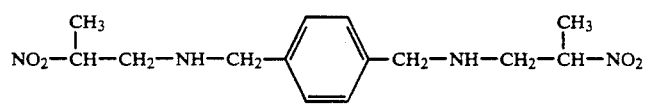 (36)
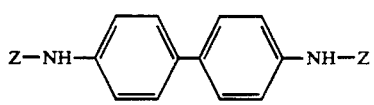 (37)
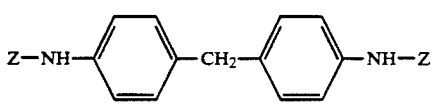 (38)
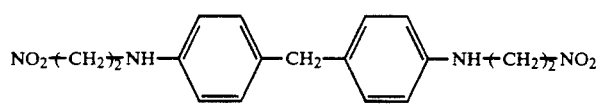 (39)

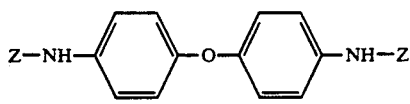 (40)

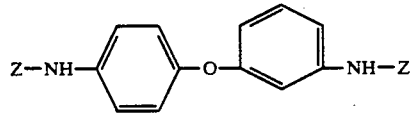 (41)

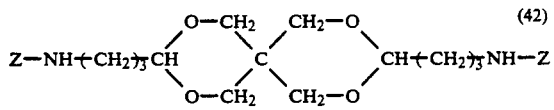 (42)

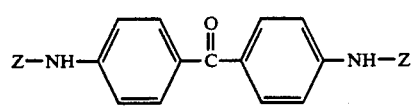 (43)

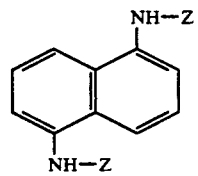 (44)

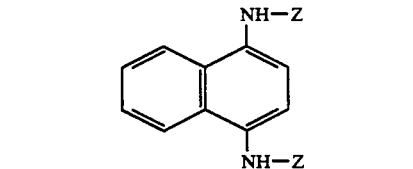 (45)

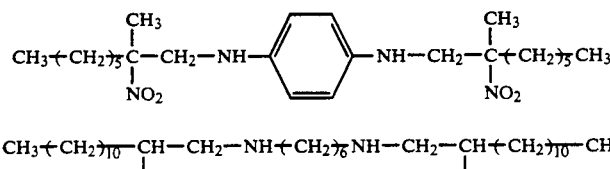 (46)

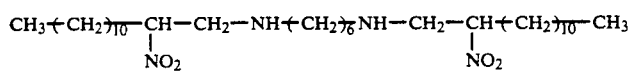 (47)

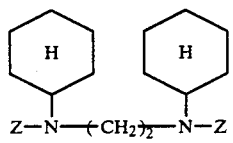 (48)

In the formula (A), it is preferred that X is a straight chain saturated aliphatic group of 2-12 carbon atoms, $R_1$ is a hydrogen atom and $R_2$ and $R_3$ are both methyl groups. The most preferred is N,N'-bis(2-methyl-2-nitropropyl)-1,6-diaminohexane.

An amount of the dinitrodiamine compounds represented by the formula (A) to the ethylene-α-olefin-nonconjugated diene copolymer rubbers modified with unsaturated carboxylic acids or derivatives thereof is usually 0.1 to 10 parts, preferably 0.5-5 parts by weight every 100 parts by weight of the ethylene-α-olefin-nonconjugated diene copolymer rubbers modified with unsaturated carboxylic acids or derivatives thereof. If the amount of dinitrodiamines is too small, endurance is insufficient, while if the amount is too large, no additional advantage is obtained, i.e., uneconomical.

The modified rubber compositions may contain various fillers, softeners, additives, aging inhibitors and the like.

Examples of fillers are carbon black, silica, talc, calcium carbonate and clay which are conventionally used in the field of rubbers. Carbon black is preferred from the point of fatigue resistance. Carbon black includes, for example, HAF, FEF and SRF blacks and can be used without limitation in strength of reinforcing action.

Moreover, if necessary from the point of processability or the like, unmodified ethylene-α-olefin-nonconjugated diene copolymer rubbers and/or other rubbers may be added.

For kneading of them, there may be employed internal kneading machines such as Banbury mixer, open rolls and the like which are commonly used in the field of rubber industry.

The modified rubber composition thus obtained is further vulcanized with sulfur organic peroxides.

Any of the organic peroxides useful for vulcanization may be used. Examples of organic peroxides are ditertiarybutyl peroxide, teriarybutylcumyl peroxide, dicumyl peroxide, α,α-bis(tertiarybutylpeoxyisopropyl)benzene, 2,5-dimethyl-2,5-di(tertiarybutylperoxy)hexane, 2,5-dimethyl-2,5-di(tertiarybutylperoxy)hexyne-3, 1,1-bis(teriarybutylperoxy)-3,3,5-trimethylcyclohexane, n-butyl-4,4-bis(tertiarybutylperoxy)valerate, 2,2-bis(tertiarybutylperoxy)butane and 2,2-bis(teriarybutylperoxy)octane. In order to facilitate crosslinking at vulcanization, any aids may be added. Examples of the aids are p,p'-dibenzoylquinonedioxime, quinonedioxime, triallylcyanurate, ethylene dimethacrylate, N,N'-m-phenylenebismaleimide, triallylisocyanurate and trimethylolpropane trimethacrylate.

Vulcanization is conducted usually at a temperature of 120° C. or higher, preferably 150°-220° C. for one to 30 minutes in, for example, a press or an injection molding machine.

Vulcanized rubber composition thus obtained are excellent in heat resistance and besides in fatigue resistance against repeated deformation in ordinary and high temperature atmospheres. The vulcanized rubber composition is suitable for rubber vibration insulators.

The present invention will be explained by the following nonlimiting examples.

EXAMPLE 1

A rubber component was prepared by kneading components under the conditions mentioned in the column of "Conditions for preparation of rubber component" for Example 1 in Table 1 by 350 E type Brabender mixer (internal volume: 400 ml). Kneading procedure was as follows: Rotor speed was set at 60 rpm, the atmosphere in the mixer was replaced with nitrogen, and then Esprene 671 F (ethylene-propylene-ethylidene norbornene copolymer rubber manufactured by Sumitomo Chemical Co. Ltd. containing 70 parts of oil-extended product) was charged in the mixer, followed by kneading for 2 minutes. Then, other components were charged in accordance with Table 1, followed by further kneading for 8–13 minutes to obtain a modified rubber. Addition amount of maleic anhydride is shown in Table 1.

Addition amount of maleic anhydride was measured by the following method.

A small amount of a sample was dissolved in heated xylene and purified by precipitation with anhydrous acetone. Then, the purified sample was again dissolved in xylene and the solution was titrated with a methanolic NaOH solution at 110°–120° C. using phenolphthalein as an indicator to obtain the addition amount of maleic anhydride.

The resulting modified rubber was kneaded with the compounding ingredients mentioned in the column of "Compounding" (except for vulcanization accelerator and sulfur) by a Banbury mixer of 1.7 liter at 120° C. for 4 minutes. The kneaded product was left until it was cooled to room temperature and then kneaded with vulcanization accelerators TMTD, MBTS and sulfur by an 8 inch open roll at 40°–60° C. to obtain a compound. Viscosity of this compound was measured by the method of JIS K-6300. Further, this compound was vulcanized using a hot press at 170° C. for 10 minutes to obtain a vulcanized sheet of 2 mm thick. Separately, the compound was vulcanized at 170° C. for 15 minutes to obtain a test piece for measuring compression set.

These vulcanized rubber samples were evaluated on various properties.

Tensile test, tear test, hardness test and compression set test were conducted in accordance with JIS K-6301. Stretch fatigue characteristic was evaluated by measuring the stretching number before breaking under the conditions of strain 0–200% and temperature 100° C. using flexing fatigue tester manufactured by Ueshima Seisakusho Co.

The results are shown in Table 2.

EXAMPLES 2–3 AND COMPARATIVE EXAMPLES 1–3

The procedure of Example 1 was repeated except that conditions shown in the columns of respective examples and comparative examples in Table 1. The results are shown in Table 2.

Examples which satisfy all of the conditions defined give excellent results in all of items for evaluation. On the other hand, comparative examples which do not fulfil all of the conditions defined give no satisfactory results. That is, comparative examples 1 and 2 wherein no modification of ethylene-α-olefin-nonconjugated diene copolymer rubber with maleic anhydride is made and no dinitroamines is used, comparative example 3 wherein modification with maleic anhydride is made but no dinitroamines is used, and and comparative example 4 wherein, although modification with maleic anhydride is made, an amount of maleic anhydride is smaller than the defined amount, result in poor stretch fatigue. Comparative example 5 wherein excess amount of maleic anhydride is used produces a large number of gel.

TABLE 1

| Conditions for preparation of rubber component | (part by weight) | | | | | | | |
|---|---|---|---|---|---|---|---|---|
| | Example | | | Comparative Example | | | | |
| | 1 | 2 | 3 | 1 | 2 | 3 | 4 | 5 |
| Components | | | | | | | | |
| Esprene 671F*[1] | 170 | 170 | 170 | 170 | 170 | 170 | 170 | 170 |
| Maleic anhydride | 2 | 3.4 | 3.4 | — | — | 3.4 | 2 | 3.4 |
| Sumifine 1162*[2] | — | — | — | 2 | — | — | — | — |
| Perhexa 3M/40*[3] | 0.1 | 0.1 | 0.1 | — | — | 0.1 | 0.1 | 0.1 |
| Modification conditions | | | | | | | | |
| Kneading temperature °C. | 151 | 150 | 150 | 150 | 150 | 150 | 100 | 150 |
| Total kneading time (min) | 15 | 10 | 10 | 10 | 10 | 10 | 10 | 20 |
| Maleic anhydride addition amount wt %*[5] | 0.05 | 0.06 | 0.06 | — | — | 0.06 | 0.007 | 0.2 |
| Compounding | | | | | | | | |
| Rubber component | 172.1 | 173.5 | 173.5 | 172.0 | 170.0 | 173.5 | 172.1 | 173.5 |
| FEF black | 100 | 100 | 100 | 100 | 100 | 100 | 100 | 100 |
| Diana PW90*[4] | 35 | 35 | 35 | 35 | 35 | 35 | 35 | 35 |
| Zinc oxide | 5 | 5 | 5 | 5 | 5 | 5 | 5 | 5 |
| Stearic acid | 1 | 1 | 1 | 1 | 1 | 1 | 1 | 1 |
| Simifine 1162*[2] | 2 | 2 | 1 | — | — | — | 2 | 2 |
| Vulcanization accelerator TMTD | 2 | 2 | 2 | 2 | 2 | 2 | 2 | 2 |
| Vulcanization accelerator TBTS | 2.5 | 2.5 | 2.5 | 2.5 | 2.5 | 2.5 | 2.5 | 2.5 |
| Sulfur | 1.2 | 1.2 | 1.2 | 1.2 | 1.2 | 1.2 | 1.2 | 1.2 |

*[1]Ethylene-propylene-ethylidene norbornene copolymer rubber containing 70 parts of oil-extended rubber manufactured by Sumitomo Chemical Co. Ltd., namely, containing 70 parts by weight of extender oil in the 170 parts by weight.
*[2]N,N'-bis(2-methyl-2-nitropropyl)-1,6-diaminohexane manufactured by Sumitomo Chemical Co., Ltd.
*[3]1,1-Bis(t-butylperoxy)3,3,5-trimethyl-cyclohexane concentrated to 40% which was an organic peroxide manufactured by Nippon Oil & Fats Co., Ltd.
*[4]A process oil manufactured by Idemitsu Kosan Co., Ltd.
*[5]Percent by weight of maleic anhydride based on the modified ethylene-α-olefin-nonconjugated diene copolymer rubber.

TABLE 2

| Evaluation | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Viscosity of compound ML1+4 100° C. | 70 | 72 | 72 | 67 | 71 | 72 | 70 | 110 |
| Tensile strength Kgf/cm² | 180 | 182 | 181 | 178 | 170 | 167 | 175 | * |
| Ultimate elongation % | 600 | 630 | 640 | 590 | 590 | 600 | 580 | * |
| Hardness JIS-A | 55 | 56 | 55 | 56 | 55 | 55 | 55 | * |
| Tear strength Kgf/cm | 35 | 35 | 35 | 34 | 33 | 33 | 32 | * |
| Compression set % 100° C. 22 Hr | 28 | 28 | 28 | 27 | 30 | 31 | 28 | * |
| Stretch fatigue** 0-200% 100° C. | >700 | >700 | >700 | 41 | 8 | 15 | 45 | * |

*There were so large number of gel that molding processability was remarkably poor. Hardly evaluable.
**10³ times As explained above, the present invention provides a vulcanized rubber composition which is excellent in heat resistance and besides is excellent in fatigue resistance against repeated deformation in ordinary temperature and high temperature atmospheres.

We claim:

1. A vulcanized rubber composition obtained by vulcanizing a modified ethylene-α-olefin-nonconjugated diene copolymer rubber composition defined below with sulfur or organic peroxides, said modified copolymer rubber composition comprising an ethylene-α-olefin-nonconjugated diene copolymer rubber modified with 0.01-0.15% by weight of an unsaturated carboxylic acid or a derivative thereof based on the modified ethylene-α-olefin-nonconjugated diene copolymer rubber and at least one dinitroamine represented by the following formula (A):

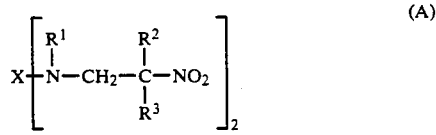

(A)

wherein X represents a divalent chain aliphatic, cyclic aliphatic or aromatic group which may contain a halogen or oxygen, $R^1$ represents a hydrogen atom, a chain aliphatic group, a cyclic aliphatic group or an aromatic group with a proviso that when both X and $R^1$ represent a chain aliphatic group, nitrogen atoms may further link to each other through $R^1$, and $R^2$ and $R^3$ each represents a hydrogen atom or an alkyl group of 1-12 carbon atoms and $R^2$ and $R^3$ may link to each other to form a ring.

2. A vulcanized rubber composition according to claim 1, wherein an amount of the unsaturated carboxylic acid or derivative thereof is 0.02-0.10% by weight based on the modified ethylene-α-olefin-nonconjugated diene copolymer rubber.

3. A vulcanized rubber composition according to claim 1, wherein the derivative of unsaturated carboxylic acid is maleic anhydride.

4. A vulcanized rubber composition according to claim 1, wherein α-olefin is propylene.

5. A vulcanized rubber composition according to claim 1, wherein X in the formula (A) is a straight chain saturated aliphatic group of 2-12 carbon atoms.

6. A vulcanized rubber composition according to claim 1, wherein $R^1$ in the formula (A) is a hydrogen atom.

7. A vulcanized rubber composition according to claim 1, wherein $R^2$ and $R^3$ in the formula (A) are both methyl groups.

8. A vulcanized rubber composition according to claim 1, wherein the nonconjugated diene is 5-ethylidene-2-norbornene.

9. A vulcanized rubber composition according to claim 1, wherein the ratio of the ethylene-α-olefin-nonconjugated diene copolymer rubber modified with an unsaturated carboxylic acid or a derivative thereof to dinitroamine is 100:0.1-100:10 by weight.

10. A vulcanized rubber composition according to claim 9, wherein the ratio is 100:0.5 to 100:5.

11. A vulcanized rubber composition according to claim 1, wherein the dinitroamine is N,N'-bis(2-methyl-2-nitropropyl)-1,6-diaminohexane.

* * * * *